United States Patent
Wang et al.

(10) Patent No.: US 9,706,520 B2
(45) Date of Patent: Jul. 11, 2017

(54) METHOD, APPARATUS AND SYSTEM FOR DETERMINING TERMINAL STATE

(75) Inventors: Jian Wang, Shenzhen (CN); Chuanxi Wu, Shenzhen (CN); Hao Wu, Shenzhen (CN); Guoqiang Shang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 622 days.

(21) Appl. No.: 14/125,716

(22) PCT Filed: Apr. 25, 2012

(86) PCT No.: PCT/CN2012/074663
§ 371 (c)(1),
(2), (4) Date: Dec. 12, 2013

(87) PCT Pub. No.: WO2012/174943
PCT Pub. Date: Dec. 27, 2012

(65) Prior Publication Data
US 2014/0194150 A1    Jul. 10, 2014

(30) Foreign Application Priority Data
Jun. 20, 2011    (CN) .......................... 2011 1 0166107

(51) Int. Cl.
*H04W 68/00* (2009.01)
*H04W 68/02* (2009.01)
(Continued)

(52) U.S. Cl.
CPC ........... *H04W 68/02* (2013.01); *H04W 4/005* (2013.01); *H04W 60/02* (2013.01); *H04W 68/00* (2013.01)

(58) Field of Classification Search
None
See application file for complete search history.

(56) References Cited

U.S. PATENT DOCUMENTS

| 2009/0109888 A1* | 4/2009 | Xie ........................ | H04W 60/00 370/311 |
| 2010/0189036 A1* | 7/2010 | Liu ........................ | H04W 60/02 370/328 |

FOREIGN PATENT DOCUMENTS

| CN | 101064932 | 10/2007 |
| CN | 101179838 | 5/2008 |

(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access Release 10)," 3GPP Standard; 3GPP TS 23.401, vol. SA WG2, No. V10.4.0, Jun. 10, 2011(Jun. 10, 2011) XP050552991.

(Continued)

*Primary Examiner* — Suhail Khan
(74) *Attorney, Agent, or Firm* — Plumsea Law Group, LLC

(57) ABSTRACT

With a method, apparatus and system for determining a terminal state, that a network side considers that a terminal is in an offline state by mistake can be avoided. The method includes: judging that no location update initiated by the terminal is received when a reachable timer corresponding to the terminal is expired, then sending paging message to the terminal, and triggering the terminal to initiate an interaction process with a network side to determine the terminal state. The apparatus comprises a judgment module, a sending module, and a state determination module. By adopting the method, apparatus and system, the network side can timely acquire the state of an MTC terminal, and will not consider that the terminal is in the offline state and delete the mobility context of the terminal by mistake.

10 Claims, 2 Drawing Sheets

(51) Int. Cl.
H04W 60/02 (2009.01)
H04W 4/00 (2009.01)

(56) References Cited

FOREIGN PATENT DOCUMENTS

| CN | 101568177 | 10/2009 |
| CN | 101568178 | 10/2009 |
| CN | 101998590 | 3/2011 |

OTHER PUBLICATIONS

"3rd Generation Partnership Project; Technical Specification Group and System Aspects; System Improvements for Machine-Type Communications; (Release 11)," 3GPP Standard; 3GPP TR 21888, vol. SA WG2, No. V1.3.0,—Jun. 3, 2011 (Jun. 3, 2011), XP050552911.

NTT Docomo "Discussion on the Target Procedures for the NAS Back-off Timer," 3GPP TSG SA WG2 Meeting #80, Aug. 30-Sep. 3, 2010, Brunstad, Norway, TD S2-103784.

NEC "Issued with Solution 6.17-Allowed Time Period after TAU/RAU," 3GPP TSG SA WG2 Meeting #79E (Electronic) Jul. 6-13, 2010, Elbonia, TD S2-103185.

Ericsson et al. "Clasification on the Interaction Between Time Controlled Devices, Periodic Timers and Wait Time," 3GPP TSG SA WG2 Meeting #79E (Electronic), Jul. 6-13, 2010, Elbonia, TD S2-103132.

Supplementary European Search Report issued Oct. 26, 2015 in European Patent Application No. EP12802251.4.

\* cited by examiner

METHOD, APPARATUS AND SYSTEM FOR DETERMINING TERMINAL STATE

TECHNICAL FIELD

The present document relates to the mobile communication field, and in particular, to a method, apparatus and system for determining a terminal state.

BACKGROUND OF THE RELATED ART

The Machine Type Communication (MTC) is the machine to machine (M2M) service a of communication type performed by the 3GPP mobile communication network, and the machine to machine service includes a monitoring system, driving direction record, physical access control, car/driving safety, etc.; the involved industry range is very large, and the quantity of the produced MTC terminals will be very enormous, and the signaling interaction among such vast MTC terminals and the network brings the potential congestion threat to the signaling network.

The related art bars visiting the signaling of the MTC terminal by adopting the system broadcast message; or bars visiting the signaling of the MTC terminal by adopting the specialized message. Through these congestion control measures, the mobile communication network can control the load of the network, and avoid the emergence of the congestion. The broadcast message will be barred through the access class barring (ACB)/extended access barring (EAB), and the terminal meeting the ACB/EAB barring condition will start one timer which is related to the back-off time; and during the operation of that timer, the terminal is unable to initiate the signaling visit. When the signaling visit of the MTC terminal is barred with the specialized message, the non-access node, such as the mobility management entity (MME), indicates the terminal not to initiate the signaling request within the back-off time by bringing the back-off time into the response for the non-access layer signaling request of the MTC terminal; or the access layer node, such as the evolved node B (eNB), indicates that the MTC can initiate the signaling visit again only after the wait time by bringing the wait time into the response message for the wireless resource control connection request of the MTC terminal.

In the actual application, the phenomenon that the core network considers that a certain MTC terminal is in offline state but actually the MTC terminal is not offline, often happens.

SUMMARY

In order to overcome the above problems, the present document provides a method, apparatus and system for determining a terminal state, to avoid that the network side considers that the terminal is in the offline state by mistake.

In order to solve the above-mentioned technical problem, the embodiment of the present document provides a method for determining a terminal state, comprising:

a network side judging that no location update initiated by the terminal is received when a reachable timer corresponding to the terminal is expired, then sending paging message to the terminal, and triggering the terminal to initiate an interaction process with the network side to determine the terminal state.

Preferably, sending paging message to the terminal and triggering the terminal to initiate an interaction process with the network side comprises: sending paging message carrying a tracking area update (TAU) indication to the terminal, and triggering the terminal to initiate a TAU process to a network management entity to which the terminal belongs currently.

Preferably, sending paging message to the terminal and triggering the terminal to initiate an interaction process with the network side comprises: sending the paging message to the terminal, and triggering the terminal to initiate service request message to a network management entity to which the terminal belongs currently; and the method further comprises: the network management entity feeds back service reject message to the terminal after receiving the service request message.

Preferably, sending paging message to the terminal and triggering the terminal to initiate an interaction process with the network side comprises: sending the paging message to the terminal, and triggering the terminal to initiate service request message to a first network management entity to which the terminal belongs currently; and the first network management entity feeding back reject message for which the reason is load balance to the terminal after receiving the service request message, and triggering the terminal to initiate a TAU process to a second network management entity.

Preferably, determining the terminal state comprises:

after the interaction process with the network side initiated by the terminal is completed, the network side determining that the terminal is in an online state, and restarting a reachable timer corresponding to the terminal.

The embodiment of the present document further provides a method for determining a terminal state, comprising:

the terminal initiating a location update to a network management entity to which the terminal belongs when a periodical timer of the terminal is expired within a time limit of a terminal, so as to make a network side determine that the terminal is in an online state.

Preferably, the time limit comprises a back-off time or a wait time; and the terminal comprises a machine type communication (MTC) terminal or a non-MTC terminal.

The embodiment of the present document further provides a method for determining a terminal state, comprising:

a network side lengthening a time of a reachable timer corresponding to a terminal, the time of the reachable timer after lengthening is equal to or greater than a maximum value of a time limit of the terminal; and if the terminal fails to trigger the location update before a periodical timer of the terminal is expired, then the terminal reinitiating a location update process to the network side when a timer for limiting time is expired, so as to make the network side determine that the terminal is in an online state.

Preferably, the time limit comprises a back-off time or a wait time; and the terminal comprises a machine type communication (MTC) terminal or a non-MTC terminal.

The embodiment of the present document further provides an apparatus for determining a terminal state, comprising a judgment module, a sending module and a state determination module, wherein, the judgment module is configured to judge whether a location update initiated by the terminal is received when a reachable timer corresponding to the terminal is expired;

the sending module is configured to send paging message to the terminal when the judgment module judges that no location update initiated by the terminal is received when the reachable timer corresponding to the terminal is expired, and trigger the terminal to initiate an interaction process with the network side; and the state determination module is configured to determine the terminal state.

Preferably, the sending module is configured to send the paging message to the terminal and trigger the terminal to initiate the interaction process with the network side by means of: sending paging message carrying a tracking area update (TAU) indication to the terminal, and triggering the terminal to initiate a TAU process to a network management entity for which the terminal belongs currently; or the sending module is configured to send the paging message to the terminal and trigger the terminal to initiate the interaction process with the network side by means of: sending the paging message to the terminal, and triggering the terminal to initiate service request message to the network management entity for which the terminal belongs currently; and the sending module is further configured to feed back service reject message to the terminal after receiving the service request message; or the sending module is configured to send the paging message to the terminal and trigger the terminal to initiate the interaction process with the network side by means of: sending the paging message to the terminal, and triggering the terminal to initiate the service request message to a first network management entity to which the terminal belongs currently; and the sending module is further configured to feed back the reject message for which the reason is load balance to the terminal after receiving the service request message, and trigger the terminal to initiate a TAU process to a second network management entity.

Preferably, the determination module is configured to determine the terminal state by means of: after the interaction process with the network side initiated by the terminal is completed, determining that the terminal is in an online state, and restarting a reachable timer corresponding to the terminal.

The embodiment of the present document further provides an apparatus for determining a terminal state, located in a terminal, comprising a timer judgment module and a sending module, wherein:

the timer judgment module is configured to judge whether a periodical timer of the terminal is expired within a time limit of the terminal; and the sending module is configured to initiate a location update to a network management entity to which the terminal belongs when the timer judgment module judges that the periodical timer of the terminal is expired within the time limit of the terminal, so as to make a network side determine that the terminal is in an online state.

The embodiment of the present document further provides a system for determining a terminal state, comprising a lengthening module and a sending module, wherein:

the lengthening module is located in a network side and configured to lengthen a time of a reachable timer corresponding to a terminal, and the time of the reachable timer after lengthening is equal to or greater than a maximum value of the time limit of the terminal; and the sending module is located in a terminal side and configured to judge that the terminal fails to trigger the location update before a periodical timer of the terminal is expired, and then reinitiate a location update process to the network side when a timer for limiting time is expired, so as to make the network side determine that the terminal is in an online state.

The network side can acquire the state of the MTC terminal in time by adopting the method, apparatus and system described by the embodiments of the present document, and will not consider by mistake that the terminal is in the offline state (unreachable) and delete the mobility context of the terminal

DESCRIPTION OF THE PREFERRED EMBODIMENTS

Figure 1:
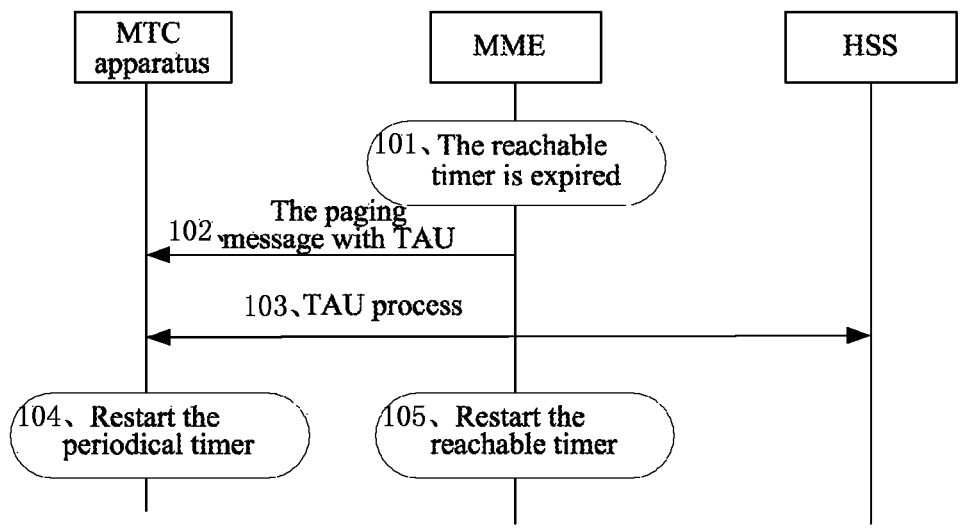
FIG. 1 is a scheme flow chart of embodiment 1 of the present document.

The back-off time and the wait time are referred to as the time limit in the present text. It is found, through analyzing the related art, that because the MTC terminal cannot initiate the signaling connection initiatively after entering the time limit, it will cause that the MTC terminal lose the contact with the mobile communication network temporarily. If the range of that time limit just covers the arrival time of the periodical timer of the MTC terminal, then when the periodical timer of the MTC terminal is expired, the MTC terminal will not initiate the TAU process, and the consequence is that the core network will not receive the TAU process initiated by the MTC terminal when the reachable timer (the reachable timer is in pace with the periodical timer on the MTC terminal) of the MME aiming at the MTC terminal is expired, and then the core network considers that the MTC terminal is in the offline state and will delete the mobility context of the MTC terminal.

Method 1 for Determining a Terminal State a network side judging that no location update initiated by the terminal is received when a reachable timer corresponding to the terminal is expired, then sending paging message to the terminal, and triggering the terminal to initiate an interaction process with the network side to determine the terminal state.

The above mentioned sending paging message to the terminal and triggering the terminal to initiate an interaction process with the network side includes any of the following modes:

Mode 1:

sending paging message carrying a tracking area update (TAU) indication to the terminal, and triggering the terminal to initiate a TAU process to a network management entity to which the terminal belongs currently;

Mode 2:

sending the paging message to the terminal, and triggering the terminal to initiate service request message to a network management entity to which the terminal belongs currently; and the network management entity feeding back service reject message to the terminal after receiving the service request message. For details, refer to embodiment 2;

Mode 3:

sending the paging message to the terminal, and triggering the terminal to initiate service request message to a first network management entity to which the terminal belongs currently; and the first network management entity feeding back reject message for which the reason is load balance to the terminal after receiving the service request message, and triggering the terminal to initiate a TAU process to a second network management entity. For details, refer to embodiment 3.

The apparatus for realizing the method includes a judgment module, a sending module and a state determination module, wherein, the judgment module is configured to judge whether a location update initiated by the terminal is received when a reachable timer corresponding to the terminal is expired;

the sending module is configured to send paging message to the terminal when the judgment module judges that no location update initiated by the terminal is received when the reachable timer corresponding to the terminal is expired, and trigger the terminal to initiate an interaction process with the network side; and the state determination module is configured to determine the terminal state.

The sending module is configured to send paging message to the terminal and trigger the terminal to initiate an interaction process with the network side by means of: sending paging message carrying a tracking area update (TAU) indication to the terminal, and triggering the terminal to initiate a TAU process to a network management entity to which the terminal belongs currently; or the sending module is configured to send paging message to the terminal and trigger the terminal to initiate an interaction process with the network side by means of: sending the paging message to the terminal, and triggering the terminal to initiate service request message to a network management entity to which the terminal belongs currently; and the sending module is further configured to feed back service reject message to the terminal after receiving the service request message; or the sending module is configured to send paging message to the terminal and trigger the terminal to initiate an interaction process with the network side by means of: sending the paging message to the terminal, and triggering the terminal to initiate service request message to a first network management entity to which the terminal belongs currently; and the sending module is further configured to feed back reject message for which the reason is load balance to the terminal after receiving the service request message, and trigger the terminal to initiate a TAU process to a second network management entity.

Method 2 for Determining a Terminal State the terminal initiating a location update to a network management entity to which the terminal belongs when a periodical timer of the terminal is expired within a time limit of the terminal, so as to make a network side determine that the terminal is in an online state. For details, refer to embodiment 4.

The apparatus for realizing the method is located in a terminal, and includes a timer judgment module and a sending module, wherein:

the timer judgment module is configured to judge whether a periodical timer of the terminal is expired within a time limit of the terminal; and the sending module is configured to initiate a location update to a network management entity to which the terminal belongs when the timer judgment module judges that the periodical timer of the terminal is expired within the time limit of the terminal, so as to make a network side determine that the terminal is in an online state.

Method 3 for Determining a Terminal State a network side lengthening a time of a reachable timer corresponding to a terminal, the time of the reachable timer after lengthening is equal to or greater than a maximum value of a time limit of the terminal; and if the terminal fails to trigger a location update before a periodical timer of the terminal is expired (the time of the periodical timer of the terminal is not lengthened with the reachable timer, and still remains unchanged), then the terminal reinitiating a location update process to the network side when a timer for limiting time is expired, so as to make the network side determine that the terminal is in an online state. For details, refer to embodiment 5.

The system for realizing the method includes a lengthening module and a sending module, wherein:

the lengthening module is located in a network side and configured to lengthen a time of a reachable timer corresponding to a terminal, and the time of the reachable timer after lengthening is equal to or greater than a maximum value of a time limit of the terminal; and the sending module is located in a terminal side and configured to judge that the terminal fails to trigger a location update before a periodical timer of the terminal is expired, and then reinitiate a location update process to the network side when a timer for limiting time is expired, so as to make the network side determine that the terminal is in an online state.

The embodiment of the present document is described in detail with reference to the accompanying drawings hereinafter. It should be illustrated that, in the case of not conflicting, the embodiments in the present application and features in these embodiments can be combined with each other.

Embodiment 1 as shown in FIG. 1, the following steps are included:

in step 101, the MME finds that the reachable timer of the MTC terminal is expired, but still does not receive the tracking area update (abbreviated as TAU) initiated by the MTC terminal, then step 102 is executed;

in step 102, the MME sends paging message carrying the TAU indication (paging with TAU) to the MTC terminal;

in step 103, the MTC terminal initiates the tracking area update after receiving the paging message carrying the TAU, to perform the tracking area update (TAU) process with the MME and a Home subscription Server (HSS);

in step 104, the tracking area is updated successfully, and the MTC terminal restarts the periodical timer;

in step 105, the tracking area is updated successfully, and the MME restarts the reachable timer.

In the present embodiment, if the tracking area update process is successful, then the core network (it is the MME in the present embodiment) acquires that the MTC terminal is still in the online state, and will not delete the mobility context of the MTC terminal.

Figure 2:
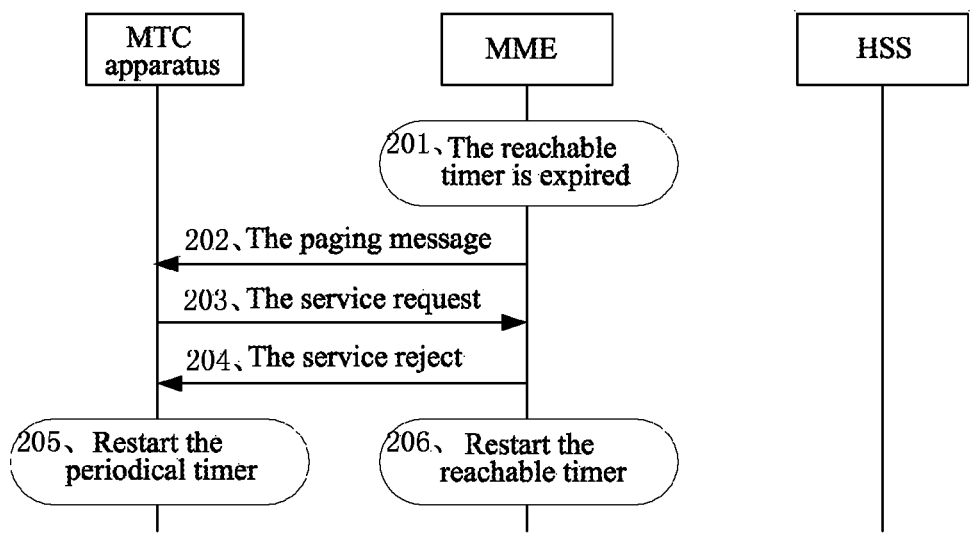
FIG. 2 is a scheme flow chart of embodiment 2 of the present document.

Embodiment 2 as shown in FIG. 2, the following steps are included:

in step 201, the MME finds that the reachable timer of the MTC terminal is expired, but still does not receive the tracking area update initiated by the MTC terminal, then step 202 is executed;

in step 202, the MME sends paging message to the MTC terminal;

in step 203, the MTC terminal sends the service request message to the MME after receiving the paging message;

now the service request message sent by the MTC terminal is empty service request message, and the MTC terminal establishes the signaling connection with the MME through the service request message;

in step 204, the MME sends service reject message to the MTC terminal;

in step 205, the MTC terminal restarts the periodical timer;

in step 206, the MME restarts the reachable timer.

Figure 3:
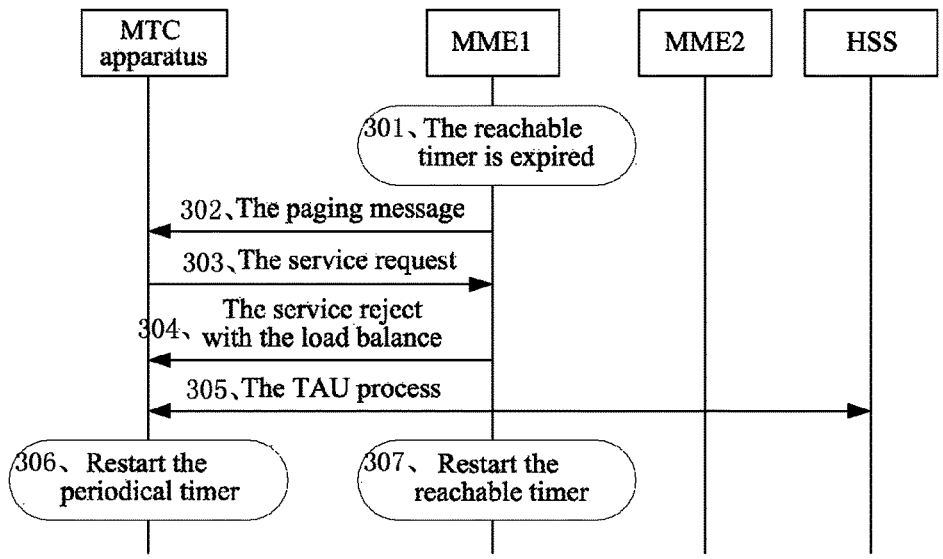
FIG. 3 is a scheme flow chart of embodiment 3 of the present document.

In the present embodiment, the MME makes the MTC terminal send the service request to the MME initiatively through sending the paging message initiatively to the MTC terminal, and then makes the core network acquire that the MTC terminal is still in the online state, and will not delete the mobility context of the MTC terminal Embodiment 3 as shown in FIG. 3, the following steps are included:

in step 301, the MME1 finds that the reachable timer of the MTC terminal is expired, but still does not receive the tracking area update initiated by the MTC terminal, then step 302 is executed;

in step 302, the MME sends paging message to the MTC terminal;

in step 303, the MTC terminal sends the service request message to the MME after receiving the paging message;

in step 304, the MME1 sends a reject message for which the reason is load balance (service reject with loadbalance TAU require) to the MTC terminal;

the MME1 can make the MTC terminal switch onto other MMEs through the above-mentioned paging message;

in step 305, the MTC terminal initiates the tracking area update, and performs the TAU process with the MME2 and the HSS in step 306, the MTC terminal restarts the periodical timer;

in step 307, the MME2 restarts the reachable timer.

In the present embodiment, the MME1 makes the MTC terminal send the service request to the MME1 and send the location update request to the MME2 through sending the paging message initiatively to the MTC terminal, and then makes the core network (it is the MME2 in the present embodiment) acquire that the MTC terminal is still in the online state, and will not delete the mobility context of the MTC terminal.

Figure 4:
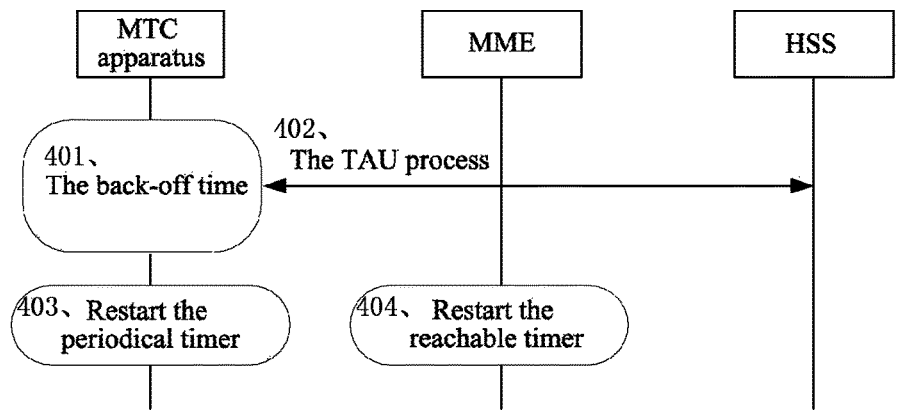
FIG. 4 is a scheme flow chart of embodiment 4 of the present document.

Embodiment 4 as shown in FIG. 4, the following steps are included:

in step 401, the MTC terminal enters the back-off time of the signaling;

in step 402, in the back-off time, the periodical timer of the MTC terminal is expired, and the MTC terminal initiates the TAU process and performs the TAU process with the MME and the HSS;

in step 403, the MTC terminal restarts the periodical timer;

in step 404, the MME restarts the reachable timer.

Figure 5:
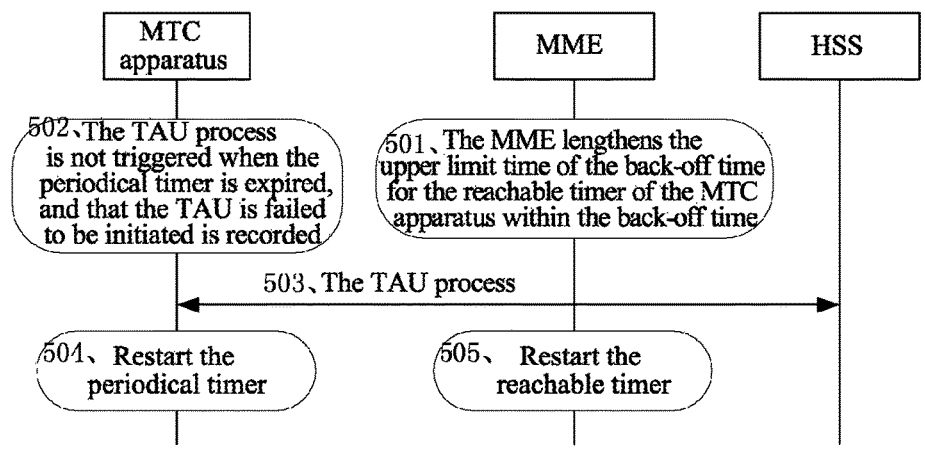
FIG. 5 is a scheme flow chart of embodiment 5 of the present document.

In the present embodiment, it is stipulated that the MTC terminal can initiate the TAU process during the time limit, which makes the core network acquire that the MTC terminal is still in the online state in time, thus will not delete the mobility context of the MTC terminal Embodiment 5 as shown in FIG. 5, the following steps are included:

in step 501, the MME lengthens the time of the reachable timer of the MTC terminal within the time limit (back-off time or wait time), and the time after lengthening is equal to or greater than the maximum value of the time limit of the MTC terminal;

in step 502, the TAU process is not triggered when the periodical timer of the MTC terminal is expired, and that the TAU is failed to be initiated (for example through the counter) is recorded;

in step 503, the timer for limiting time of the MTC terminal is expired, and the MTC terminal judges that there is a record that the TAU is failed to be initiated, then it initiates the TAU process again, to perform the TAU process with the MME and the HSS;

in step 504, the MTC terminal restarts the periodical timer;

in step 505, the MME restarts the reachable timer.

In the present embodiment, the time of the MME for determining the terminal state is delayed by lengthening the time of the reachable timer of the MME, thus making the network side obtain the correct state of the MTC terminal and avoid deleting the mobility context of the MTC terminal by mistake.

The above-mentioned various embodiments are also suitable for the non-MTC terminals which are in the back-off time of the ACB and receive the RRC Connection Release in the wait time.

The above-mentioned embodiments are only explained by taking the example that the network management entity is the MME; in 2G and 3G network, there are other corresponding network management entities, such as the Mobile Switching Center (MSC) in 2G, the service GPRS supporting node (SGSN) in 3G, etc.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The present document can have a variety of other embodiments. Those skilled in the art can make the corresponding modifications and variations according to the present document without departing from the spirit and essence of the present document. And all of these modifications or the variations should be embodied in the scope of the appended claims of the present document.

INDUSTRIAL APPLICABILITY

With the method, apparatus and system described by the embodiments of the present document, the network side can acquire the state of the MTC terminal in time while will not consider that the terminal is in the offline state (unreachable) and delete the mobility context of the terminal by mistake.

What we claim is:

1. A method for determining a terminal state, comprising:
a network side judging that no location update initiated by a terminal is received when a reachable timer corresponding to the terminal is expired, then sending paging message to the terminal, and triggering the terminal to initiate an interaction process with the network side to determine the terminal state; and
after the interaction process with the network side initiated by the terminal is completed, the network side determining that the terminal is in an online state, and restarting the reachable timer corresponding to the terminal;
wherein,
sending paging message to the terminal and triggering the terminal to initiate an interaction process with the network side comprises: sending the paging message to the terminal, and triggering the terminal to initiate service request message to a network management entity to which the terminal belongs currently; and
the method further comprises: the network management entity feeds back service reject message to the terminal after receiving the service request message, and the network management entity then restarts the reachable timer; and
after receiving the service reject message, the terminal restarts a periodical timer.

2. The method according to claim 1, wherein,
sending paging message to the terminal and triggering the terminal to initiate an interaction process with the network side comprises: sending the paging message carrying a tracking area update (TAU) indication to the terminal, and triggering the terminal to initiate a TAU process to the network management entity to which the terminal belongs currently.

3. The method according to claim 1, wherein,
sending paging message to the terminal and triggering the terminal to initiate an interaction process with the network side comprises: sending the paging message to the terminal, and triggering the terminal to initiate service request message to the network management entity to which the terminal belongs currently; and the network management entity feeding back service reject message containing a rejection reason which is load balance to the terminal after receiving the service request message, and triggering the terminal to initiate a tracking area update (TAU) process to a second network management entity.

4. The method according to claim 1, further comprising:
the terminal initiating a location update to the network management entity to which the terminal belongs when the periodical timer of the terminal is expired within a time limit of the terminal, so as to make the network side determine that the terminal is in an online state.

5. The method according to claim 4, wherein,
the time limit comprises a back-off time or a wait time; and
the terminal comprises a machine type communication (MTC) terminal or a non-MTC terminal.

6. The method according to claim 1, further comprising:
the network side lengthening a time of the reachable timer corresponding to the terminal, the time of the reachable timer after lengthening is equal to or greater than a maximum value of a time limit of the terminal; and
if the terminal fails to trigger a location update before the periodical timer of the terminal is expired, then the terminal reinitiating a location update process to the network side when a timer for limiting time is expired, so as to make the network side determines that the terminal is in an online state.

7. The method according to claim 6, wherein,
the time limit comprises a back-off time or a wait time; and
the terminal comprises a machine type communication (MTC) terminal or a non-MTC terminal.

8. An apparatus for determining a terminal state, comprising a judgment module, a sending module and a state determination module, wherein,
the judgment module is configured to judge whether a location update initiated by a terminal is received when a reachable timer corresponding to the terminal is expired;
the sending module is configured to send paging message to the terminal when the judgment module judges that no location update initiated by the terminal is received when the reachable timer corresponding to the terminal is expired, and trigger the terminal to initiate an interaction process with a network side; and
the state determination module is configured to determine the terminal state by means of: after the interaction process with the network side initiated by the terminal is completed, determining the terminal is in an online state, and restarting the reachable timer corresponding to the terminal;
the sending module is configured to send the paging message to the terminal and trigger the terminal to initiate the interaction process with the network side by means of: sending the paging message to the terminal, and triggering the terminal to initiate service request message to a network management entity to which the terminal belongs currently; and the sending module is further configured to feed back service reject message to the terminal after receiving the service request message;
wherein the reachable timer is restarted by the network management entity after the sending module feeds back the service reject message to the terminal; and
after receiving the service reject message, the terminal restarts a periodical timer.

9. The apparatus according to claim 8, wherein,
the sending module is configured to send the paging message to the terminal and trigger the terminal to initiate the interaction process with the network side by means of: sending the paging message to the terminal, and triggering the terminal to initiate service request message to the network management entity to which the terminal belongs currently; and the sending module is further configured to feed back service reject message containing a rejection reason which is load balance to the terminal after receiving the service request message, and trigger the terminal to initiate a tracking area update (TAU) process to a second network management entity.

10. The apparatus according to claim 8, further comprising a timer judgment module and a sending module located in a terminal, wherein:
- the timer judgment module is configured to judge whether the periodical timer of the terminal is expired within a time limit of the terminal; and
- the sending module is configured to initiate a location update to the network management entity to which the terminal belongs when the timer judgment module judges that the periodical timer of the terminal is expired within the time limit of the terminal, so as to make the network side determine that the terminal is in an online state.

* * * * *